A. J. SMITH.

Assignor, by mesne assignments, to H. L. McCormick.

Grain Binder.

No. 8,143. Reissued March 26, 1878.

Witnesses

W. C. Corlies

Jno. C. MacGregor

Inventor

Henrietta L. McCormick,

Assignee of Andrew J. Smith

By Coburn & Parker

Attorneys

N. PETERS, PHOTO-LITHOGRAPHER, WASHINGTON, D. C.

UNITED STATES PATENT OFFICE.

HENRIETTA L. McCORMICK, OF CHICAGO, ILLINOIS, ASSIGNEE, BY MESNE ASSIGNMENTS, OF ANDREW J. SMITH.

IMPROVEMENT IN GRAIN-BINDERS.

Specification forming part of Letters Patent No. 61,272, dated January 15, 1867; Reissue No. 7,642, dated April 24, 1877; Reissue No. 8,143, dated March 26, 1878; application filed February 6, 1878.

*To all whom it may concern:*

Be it known that ANDREW J. SMITH, of New York, in the county and State of New York, did invent certain new and useful Improvements in Grain-Binders, which are fully set forth in the following specification, reference being had to the accompanying drawings, in which—

Figure 1:
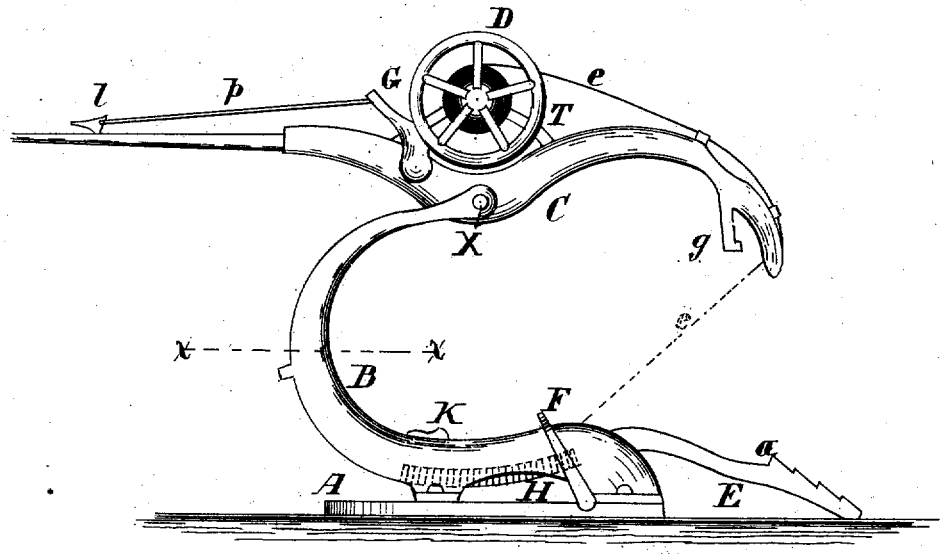
Figure 2:
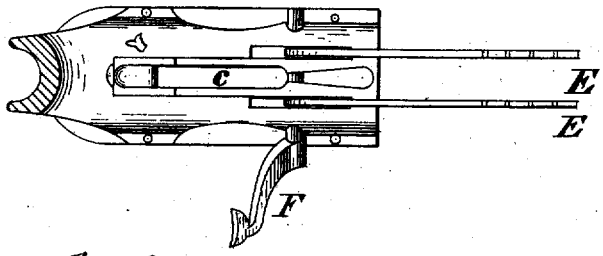
Figure 3:
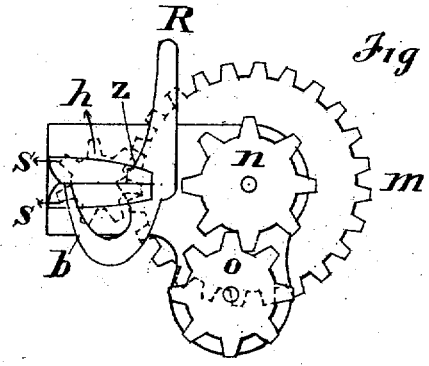

Figure 1 represents a side elevation of the grain-binder; Fig. 2, a plan view of the same, the upper portion above the line *x x*, Fig. 1, being removed; Fig. 3, a side elevation of the sliding block which carries the twisting-pinion and gearing, and Fig. 4 an inverted plan view of the same.

The invention relates to that class of grain-binders usually styled "self-binders," in which the operation of binding is automatically performed by suitable mechanism, wire being employed for the band.

The invention consists in a reciprocating twister which moves back and forth in the same path, in connection with the bundle of grain, which moves with it during the twisting, and at the same time is rotated by any suitable mechanism, for the purpose of forming the usual twist to secure the band.

It also consists in a reciprocating twister independent of the binding-arm, in combination with a rack, by means of which the twister is rotated as it is reciprocated, and a binding-arm, which delivers the wire to the twister.

It also consists in a reciprocating twister, in combination with a vibrating wire-carrier, which conveys the wire to the twister, and travels along with the latter during the operation of twisting.

It also consists in a slotted grain-receptacle, and a twister-head extended up through the slot in the receptacle, and mounted so as to be reciprocated back and forth in the slot.

It also consists in projections or stops arranged upon arms or supports, between which and the wire the grain is held as the binding-arm comes down to place the wire around the gavel; and it further consists in special devices and combinations, as will be hereinafter more fully set forth.

In the drawings, A represents a platform, upon which is mounted the frame or receptacle B of the grain-binder. This frame is curved in form, as shown in Fig. 1 of the drawings, and is made of metal or wood, being hollow on its under side and provided with ears, as shown, by means of which it is attached to the platform. An oblong slot, *c*, is cut in the foot or horizontal portion of the frame B, and extends nearly the entire length of this part of the frame. At one side of the slot is a segment, H, which is provided with cogs, and is firmly attached to the frame.

On the platform A, and near the forward part of the frame B, is a foot-lever, F, which is attached to the rock-shaft, extending from side to side of the frame, and carrying a series of forks or arms, E E, which extend forward from slots in the front end of the frame B. These forks or arms are thrown up into an upright position by forcing the lever F down toward the rear of the frame B. They are notched upon their faces next to the grain, so as to form projections or stops *a*, which hold the grain from slipping.

A bent or curved wire-carrier, C, is pivoted to the extreme upper end X of the curved portion of the frame B, so as to be free to vibrate up and down. This wire-carrier is a simple arm pivoted at about its center, and rests ordinarily in a horizontal position, so that the bent end will be raised.

A reel, D, is mounted upon a support, T, which is secured upon the wire-carrier C directly over the pivot X. This reel is made in any of the ordinary forms, and is provided with wire *e*, which passes from said reel forward upon the upper side and to the end of the wire-carrier, there being suitable eyes on the carrier to keep the wire in the right position.

A brake, G, is secured to the wire-carrier directly in front of the reel, and running from it to the portion of the carrier which forms a handle or lever is a wire, *p*, which is secured at its other end to a small latch, *l*, by means of which the velocity of the reel is regulated as the wire is drawn off. A spring, *g*, is formed at the forward end of the wire-carrier, and is placed a slight distance beneath the end of said carrier, where the wire *e* passes through. The spring and end of carrier form a jaw, as shown in Fig. 1 of the drawings.

A sliding gear-block or twister-head, K, is set within the slot *c* in the frame B, and supported on suitable guides, so as to readily slide back and forth therein. This gear-block extends upward through the slot in the receptacle, so as to project above the face of the latter, and also below the slot, to provide for the proper mounting of the twisting devices. It is provided with a large cog-wheel, *m*, set between two portions of this block at the rear end, and also a small cog-wheel, *h*, near the forward end, and between the two portions of said block, which is shown in dotted lines in Fig. 4 of the drawings.

The wheel *m* meshes with the wheel *h*, which is the twister-pinion, and is therefore rotated whenever the wheel *m* is revolved. The under portion of the gear-block is somewhat enlarged, so as to furnish support for two small pinions, *n* and *o*, which are placed upon the under side and at the rear end of the gear-block, and are arranged to mesh with each other. The pinion *o* is independent; but the pinion *n* is located directly underneath the wheel *m*, with which it is connected, so that the latter will be rotated by the revolution of the pinion *n*. The ways and gear-block are constructed so that the latter will be pinched slightly at the forward end of the former, and held from starting back until the binding-arm comes down to engage therewith.

Figure 4:
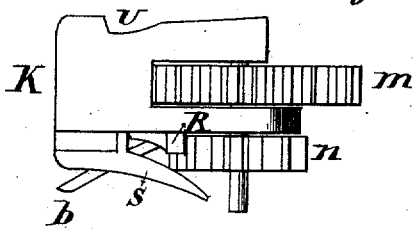

A crooked knife, R, is pivoted to the under side of the block K, forward of the wheels *n* and *o*, and has one end, *b*, extending outside of the block, as shown in Fig. 4 of the drawings. This knife is for the purpose of securing the wire by means of its crook, and also cutting it by its convex blade *z* at the proper time to sever the bundle.

Two small arms, *s s*, are fastened to the forward end of the upper portion of the block K, directly beneath the wheel *h*, for the purpose of receiving and securing the wire, as will be hereinafter set forth.

At the forward edge of the gear-block K there is a V-shaped notch, while in the wheel *h* there is a slot, which extends into the shaft, to which it is fastened. The pinion *h* is placed so that as the wire enters the V-shaped notch it is passed into the slot in said pinion for the purpose of twisting the band.

The operation of the invention is as follows: The apparatus is attached to a platform on the reaper in such position that the grain may be delivered to it conveniently. The binding-wire is passed through the eye in the bent end of the wire-carrier C, and carried down to the block K, as shown in the dotted lines in Fig. 1 of the drawings, where the end is passed through the notch in the block into the slot of the twister-pinion *h*, and secured from slipping out in the usual manner. The grain is raked upon the arms E, when the attendant presses back the foot-lever F, thereby throwing up the grain against the wire, the block K being at the forward end of the slot *c*. The attendant then depresses the bent end of the wire-carrier, which passes down in front of and around the gavel of grain, which it presses back against the wire, the latter being fed out to permit this operation. The end of the wire-carrier is forced back partly under the bundle until the jaw above described clasps the end of the gear-block K, in the forward end of which a notch, *u*, is cut, to engage with the spring-hook *g*. At the same time the wire in the end of the carrier is pressed through the notch in the block into the slot in the twister-pinion, the extreme end of the carrier passing under the end of the block for this purpose. There are now two strands of wire in the slot of the twister-pinion, and the gear-block is pushed back to the rear of the binder by the end of the wire-carrier, the attendant raising the outer or handle end thereof high enough to accomplish this purpose. As the block is forced back upon its guideways in the slot *c* the pinion *o* engages with the rack H, and is consequently rotated by the movement of the block.

It is evident, therefore, that the pinion *n* will be driven by the pinion *o*, thereby revolving the gear-wheel *m*, which, in turn, rotates the twister-pinion *h*, and thus the two strands of wire will be twisted together as the block and twister-pinion travel to the rear end of the slot *c*. Just before reaching this end of the slot the projecting end of the knife R strikes a small lug, *a*, on the frame B, thereby vibrating the knife to cut the wire in the center of the twist and release the bundle. The wire is left secured in the twister-head by the portion of the twist remaining at its end. The attendant depresses the lever end of the wire-carrier, thereby bringing forward and upward the bent end of the latter. The block K is drawn forward by the spring-hook *g* to the front end of the slot *c*, the arms E are depressed, and the binder is ready to receive another bundle.

As the gear-block is drawn forward again the projecting end of the knife strikes against another lug, *a'*, on the frame, and is turned into proper position for the next bundle.

When the grain is thrown up against the wire, the latter being in the position shown in dotted lines in Fig. 1 of the drawings, it is evident that the resistance of the wire will have a tendency to crowd the loose grain up between the wire and the arms. The teeth or projections on the arms E prevent this movement, as they act as stops to prevent the grain from slipping upward.

The extension of the twister-head up through the slot in the receiver relieves the friction of the bundle upon the latter, as the upper portion of the head forms a carrier for the bundle. It also permits the twister to be brought nearer to the bundle, thereby lessening the amount of wire necessary to be twisted in order to prevent slack after the bundle is released.

Having thus described the invention of ANDREW J. SMITH, what is claimed as new, and desired to be secured by Letters Patent, is—

1. In a grain-binder, a reciprocating twister supported independently of the binding-arm, moved back and forth in the same path, and carrying the bundle with it during the operation of twisting, in combination with mechanism whereby the twister is rotated by its reciprocation, substantially as set forth.

2. A reciprocating twister supported independently of the binding-arm, and traveling back and forth in the same path, in combination with a rack by means of which the twister is rotated as it is reciprocated, and a wire-carrier which delivers the wire to the twister, substantially as described.

3. A reciprocating twister, in combination with a vibrating wire-carrier, the end of which is carried down around the bundle to place the wire in the twister, and travels with the latter during the twisting of the band, substantially as described.

4. In a grain-binder, a slotted grain-receptacle, in combination with a twister-head extended up through the slot of the receiver, and mounted on a support, which permits it to be reciprocated, substantially as described.

5. A reciprocating head or block, K, mounted upon ways, on which it is free to move back and forth, in combination with a twister and gearing for rotating the latter, mounted on said carrier-block, substantially as described.

6. A reciprocating block, K, moving on ways, in combination with a twister, *h*, and driving-pinion *m*, mounted on its upper side, and a driving-pinion, *n*, supported on its under side, and connected with the upper pinion *m*, substantially as and for the purpose set forth.

7. A twister traveling back and forth in the same path, in combination with a binding-arm, a wire holder and cutter, either or both, moving bodily with the twister, and cams or stops, whereby the holder or cutter is operated by the reciprocation of the carrier, substantially as and for the purpose set forth.

8. The projections or stops *a*, to prevent the grain from receding, arranged upon arms or supports, between which and the wire the grain is held as the binding-arm comes down to place the wire around a fresh gavel, substantially as described.

HENRIETTA L. McCORMICK.

Witnesses:
L. A. BUNTING,
JNO. C. MACGREGOR.